(12) United States Patent
Aghara

(10) Patent No.: US 9,251,148 B2
(45) Date of Patent: Feb. 2, 2016

(54) OBJECT BASED PRIVACY CONTROL

(71) Applicant: Intel Corporation, Santa Clara, CA (US)

(72) Inventor: Sanjay Aghara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/014,926

(22) Filed: Aug. 30, 2013

(65) Prior Publication Data

US 2015/0067894 A1    Mar. 5, 2015

(51) Int. Cl.
| | |
|---|---|
| *G06F 17/30* | (2006.01) |
| *G06F 21/62* | (2013.01) |
| *G06F 21/84* | (2013.01) |
| *H04L 29/06* | (2006.01) |

(52) U.S. Cl.
CPC ...... *G06F 17/30058* (2013.01); *G06F 21/6263* (2013.01); *G06F 21/84* (2013.01); *H04L 63/0245* (2013.01); *G06F 2221/032* (2013.01)

(58) Field of Classification Search
USPC .............................................. 30/30
See application file for complete search history.

(56) References Cited

U.S. PATENT DOCUMENTS

| | | | | |
|---|---|---|---|---|
| 8,234,366 | B2* | 7/2012 | Suryanarayana et al. | H04L 12/581 379/88.01 |
| 8,271,650 | B2* | 9/2012 | Alexander | G06F 17/30899 709/225 |
| 8,387,122 | B2* | 2/2013 | Toomim | G06F 21/6218 713/183 |
| 8,588,740 | B2* | 11/2013 | Kim et al. | 455/410 |
| 2010/0316300 | A1* | 12/2010 | Epshtein et al. | 382/229 |

OTHER PUBLICATIONS

Herling et al. "Advanced Self-contained Object Removal for Realizing Real-time Diminished Reality in Unconstrained Environments" IEEE International Symposium on Mixed and Augmented Reality 2010 Science and Technolgy Proceedings Oct. 13-16, Seoul, Korea, 2010 IEEE.*

* cited by examiner

*Primary Examiner* — Beemnet Dada
(74) *Attorney, Agent, or Firm* — International IP Law Group, P.L.L.C.

(57) ABSTRACT

An electronic device may include a processor and a blacklist database listing objects not to be displayed. The processor is to remove an object from a frame before the frame is sent to or received from an electronic device when the object is listed in the blacklist database. In an example, an electronic device can include logic to receive, in a processor, a frame to be sent to or received from an electronic device and logic to scan the frame to identify an object. The electronic device can also include logic to determine if the object is listed in a blacklist database. The electronic device further includes logic to modify the frame to remove the object when the object is listed in the blacklist database and logic to transfer the frame for processing.

16 Claims, 6 Drawing Sheets

OBJECT BASED PRIVACY CONTROL

TECHNICAL FIELD

The present techniques relate generally to privacy control. In particular, the present techniques relate to a method and apparatus for object based privacy control.

BACKGROUND

Today, electronic devices are used more frequently to save a variety of information. This information includes passwords, banking information, contacts, mail, and other private information. It is also becoming common for users to share device screens with others, either by directly sharing the screen with others or by connecting the electronic device to a display device to display the screen on the display device.

BRIEF DESCRIPTION OF THE DRAWINGS

Certain exemplary examples are described in the following detailed description and in reference to the drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION OF SPECIFIC EMBODIMENTS

Examples disclosed herein provide techniques for privacy control. In today's world, it is common for users to share electronic device screens with others. For example, a user may share an electronic device screen with a tech support person. In another example, a user may show the device screen to others or connect the electronic device to a display device to share a video, text, etc. Because users share access to the electronic screens, personal information can be vulnerable to unauthorized access. In addition, personal information can be vulnerable when transferred between devices. For example, personal information can be vulnerable to access by unauthorized users when transferred over a network.

In order to protect personal information, a system and method for increasing privacy control are described herein. By listing objects in a blacklist database, a user can designate which items are not to be transferred to another device and/or displayed. When a frame is to be transferred or displayed, the process can identify objects in the frame and determine if the objects are listed in the blacklist database. If the objects are listed in the database, the objects can be removed from the frame before the frame is transferred or displayed. In this way, privacy control can be improved to protect personal information. In addition, objects can be added to the database for parental control.

Figure 1:
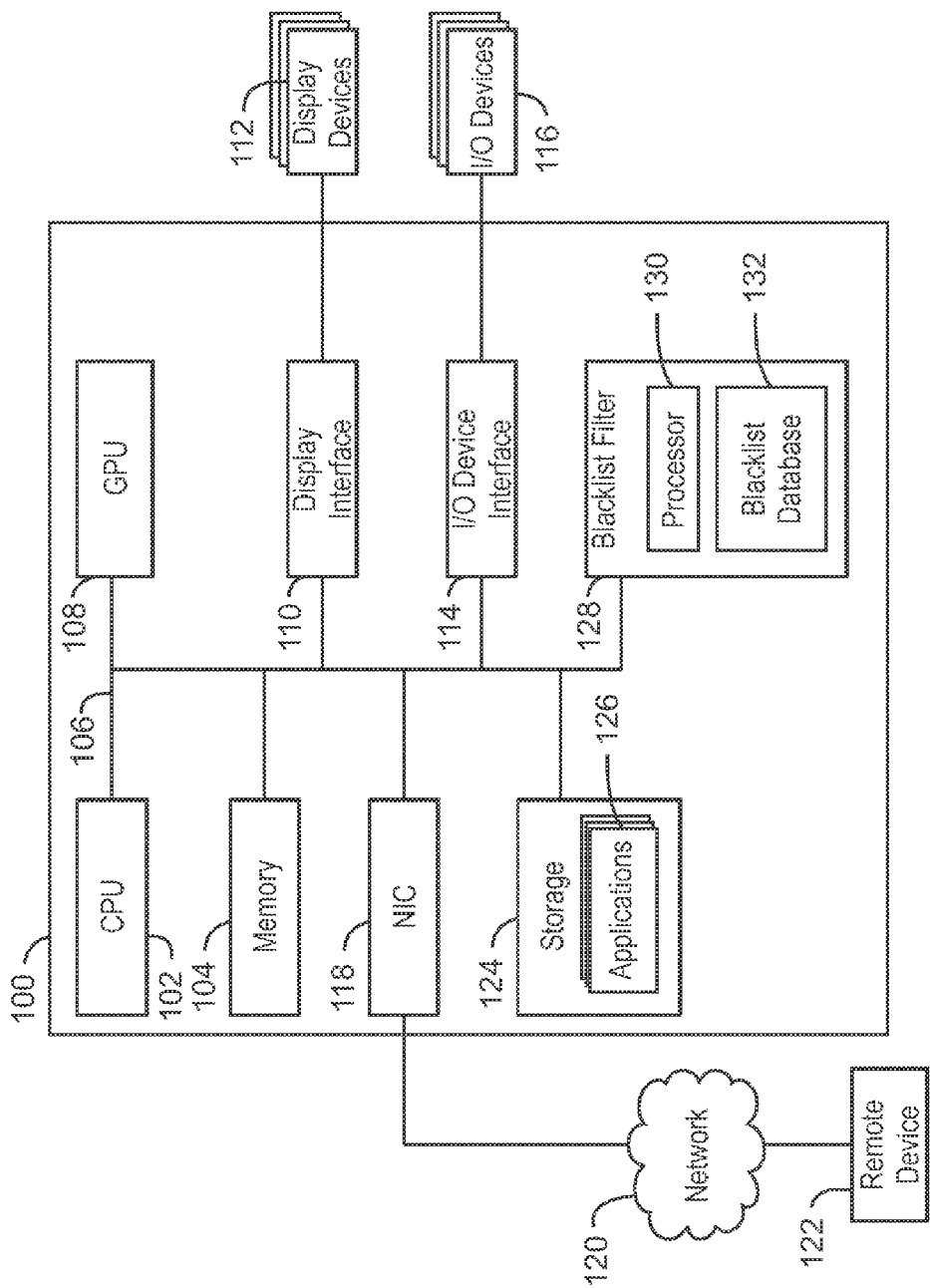
FIG. 1 is a block diagram of an example of an electronic device.

FIG. 1 is a block diagram of an example of an electronic device. The electronic device 100 may be virtually any type of electronic device including, for example and without limitation, a desktop computer, tablet computer, laptop computer, cellular phone, such as a smartphone, personal digital assistant (PDA), camera, television, video player or receiver, gaming console, and the like. The electronic device 100 can include a central processing unit (CPU) 102 to execute stored instructions, as well as a memory device 104 that stores instructions that are executable by the CPU 102. The CPU 102 can be coupled to the memory device 104 by a bus 106. Additionally, the CPU 102 can be a single core processor, a multi-core processor, or any number of other configurations. Furthermore, the electronic device 100 can include more than one CPU 102.

The electronic device 100 can also include a graphics processing unit (GPU) 108. As shown, the CPU 102 can be coupled through the bus 106 to the GPU 108. The GPU 108 can perform any number of graphics operations within the electronic device 100. For example, the GPU 108 can render or manipulate graphics images, graphics frames, videos, or the like, to be displayed to a user of the electronic device 100. In some examples, the GPU 108 includes a number of graphics engines, wherein each graphics engine is configured to perform specific graphics tasks, or to execute specific types of workloads.

The memory device 104 can include random access memory (RAM), read only memory (ROM), flash memory, or any other suitable memory systems. For example, the memory device 104 can include dynamic random access memory (DRAM). The CPU 102 can be linked through the bus 106 to a display interface 110 to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

A network interface card (NIC) 118 can connect the electronic device 100 through the system bus 106 to a network 120. The network 120 can be a wide area network (WAN), local area network (LAN), or the Internet, among others. In an example, the electronic device 100 can connect to a network via a wired connection or a wireless connection.

A remote device can be coupled to the electronic device 100, such as via the network 120. The remote device can be any suitable type of electronic device, such as a computer, a mobile device, or a display device, among others. The remote device can be coupled to the electronic device 100 through a wired or a wireless connection.

The electronic device 100 also includes a storage device 124. The storage device 124 is a physical memory such as a hard drive, an optical drive, a thumbdrive, a secure digital (SD) card, a microSD card, an array of drives, or any combinations thereof, among others. The storage device 124 can also include remote storage drives. The storage device 124 includes any number of applications 126 that run on the electronic device 100.

The electronic device 100 further includes a blacklist filter 128. The blacklist filter 128 includes a processor 130. In an example, the processor can be a specialty processor specifically the blacklist filter 128. In another example, the processor can be the CPU 102 or the GPU 108. The blacklist filter 128 also includes a database 132. The blacklist database 132 can be located in storage. For example, the blacklist database can be located in storage device 124. In another example, the blacklist database 132 can be located in a specialized storage unique to the blacklist filter 128, such as storage with extra security to protect the blacklist database 132 from unauthorized access. The blacklist database 132 is a list of objects which are not to be displayed. Displaying objects can include displaying a document or an image on a display, playing audio on an audio device, such as a speaker, or a combination thereof, among others. The blacklist database 132 can also include objects which are not to be captured. For example, the blacklist database 132 can include an image that is not to be captured by a camera or a sound that is not to be captured by an audio recorder. The objects can include a word, a phrase, an image, a color, a voice, a sound frequency, or a combination thereof, among others.

The blacklist database 132 can be updated by a user to add or remove objects from the blacklist database 132, depending on a user's location and desire to protect data. The blacklist database 132 can also include security measures to restrict access to the database 132 to the user. For example, the blacklist database 132 can include platform level security to protect the blacklist database 132 from unauthorized access.

A frame can be sent or received from a device coupled to the electronic device 100, such as an I/O device or a remote device 122. The frame can be sent or received from the device for a variety of reasons, including for transferring information and for display of the frame. When a frame is to be sent to or received from a device, the processor 130 receives the frame and scans the frame to identify objects in the frame. A frame can be an image document, such as a photograph, a text document, audio, video, or a combination thereof, among others. The processor 130 determines if the identified objects are listed in the blacklist database 132. Objects that are listed in the blacklist database 132 are removed from the frame before the frame is sent for processing. Together, the processor 130 and the blacklist database 132 can be a blacklist filter to filter objects from a frame in order to protect a user's privacy.

In an example, the frame can be displayed on the remote device 122. Before the frame is transferred to the remote device 122 to be displayed, the processor 130 can scan the frame and identify objects in the frame. The CPU/GPU 102/108 can access the blacklist database 132 to determine if the objects are listed in the blacklist database 132. Objects that are listed in the blacklist database 132 can be removed from the frame before the frame is transmitted to the remote device 122 for display. In another example, the frame can be displayed on a display 112 of the electronic device 100. Blacklisted objects can be removed from the frame before the frame is displayed on a display 112 of the electronic device 100. In a further example, the frame can be transferred to an I/O device 116, such as for storage or for data exchange. Blacklisted objects can be removed from the frame before the frame is transferred to the I/O device 116.

It is to be understood the block diagram of FIG. 1 is not intended to indicate that the electronic device 100 is to include all of the components shown in FIG. 1 in every case. Further, any number of additional components can be included within the electronic device 100, depending on the details of the specific implementation.

Figure 2:
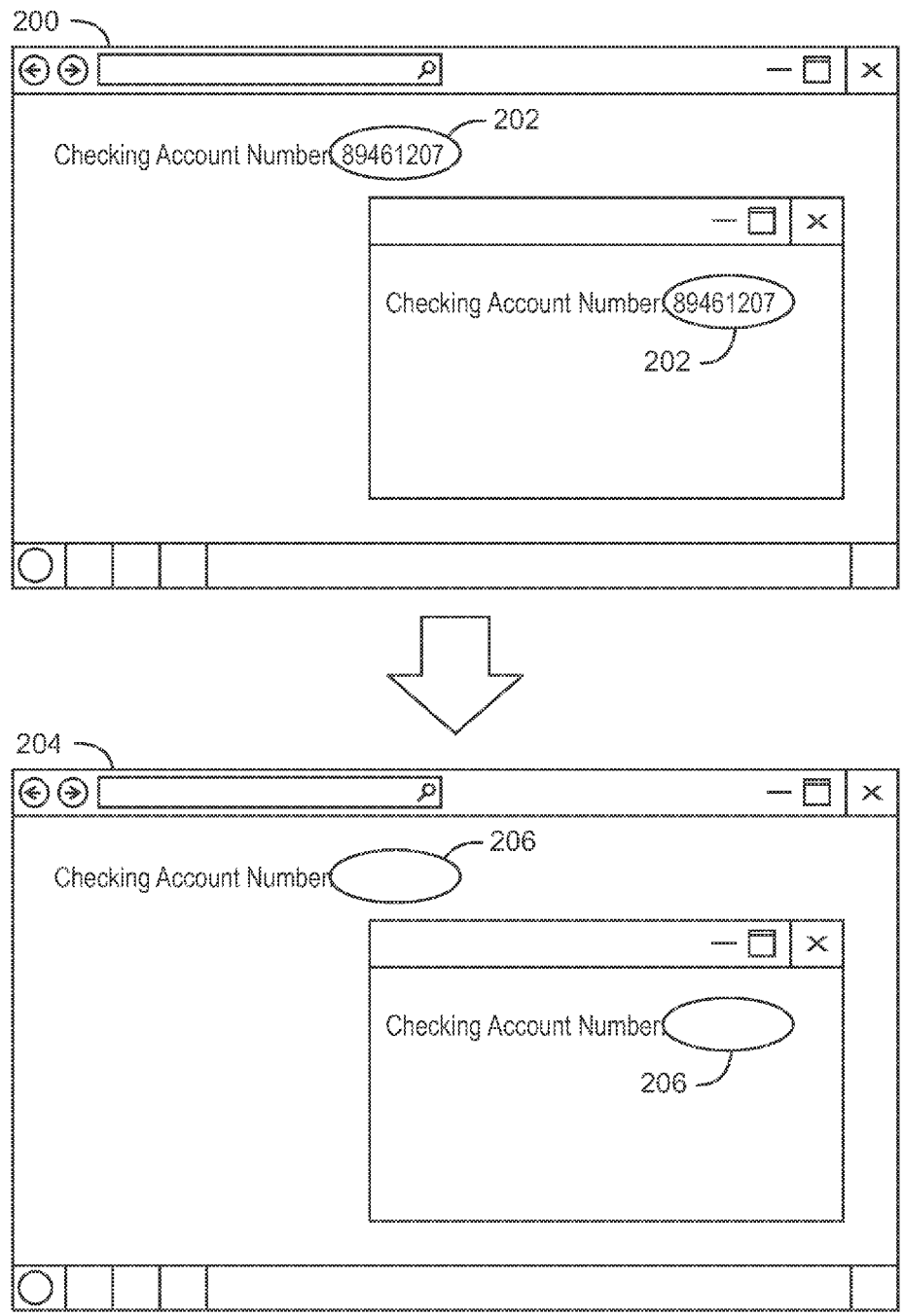
FIG. 2 is an illustration of an example of a frame and the frame with blacklisted text.

FIG. 2 is an illustration of an example of a frame and the frame with blacklisted text. The frame 200 to be displayed includes text and graphics. A processor 130 scans the frame 200 and identifies objects in the frame 200. The processor determines if the identified objects are included in the blacklist database 124. The object 202 included in the blacklist database 124 is removed from the frame 200 before the frame is displayed. The displayed frame 204 does not include the blacklisted object 206. In particular, because the frame 200 includes the word "89461207" 202, which is included in the blacklist database 124, a new frame 204 is created in which the frame 200 has been modified to exclude the word "89461207" 202. The new frame 204 is then displayed.

Figure 3:
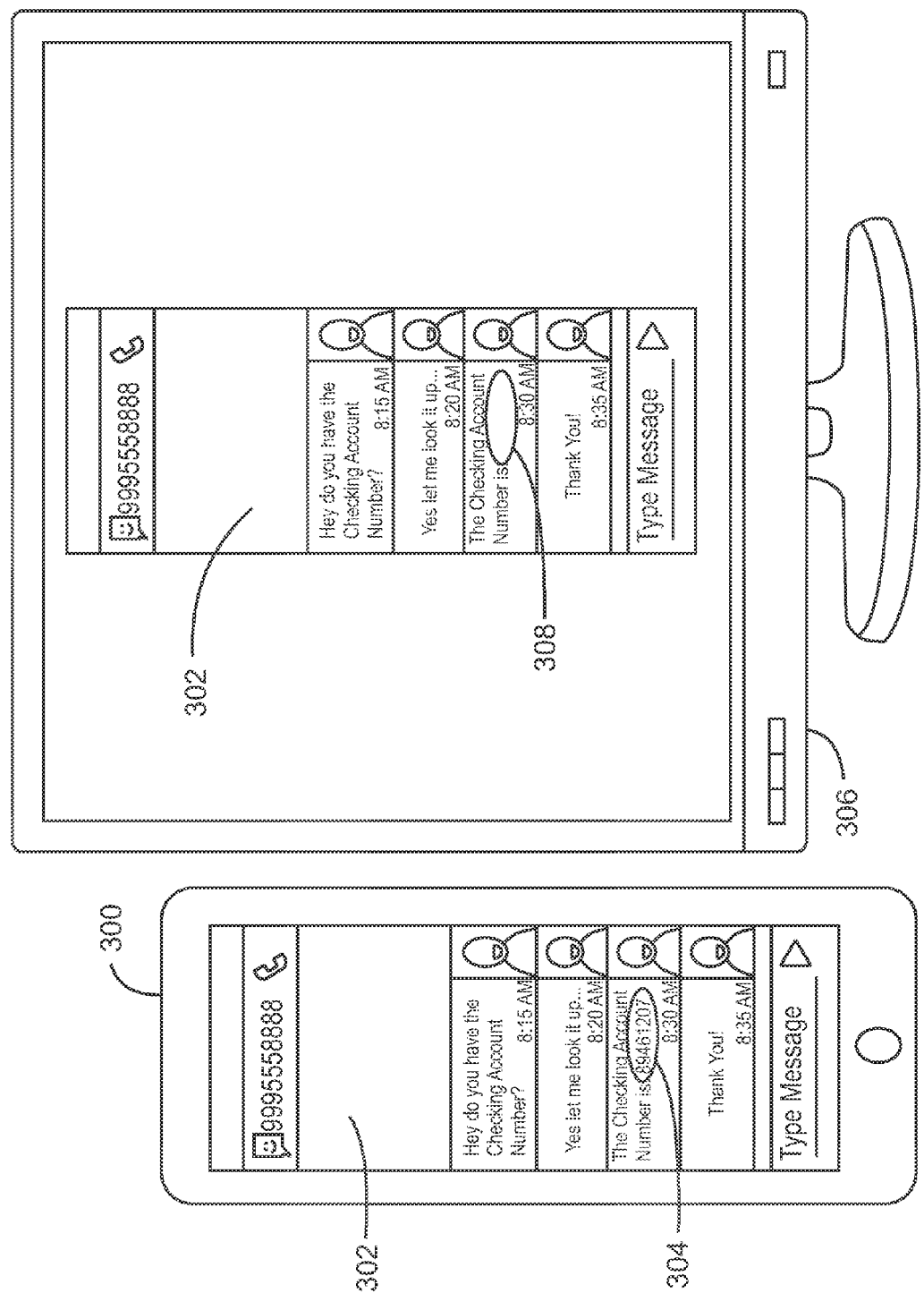
FIG. 3 is an illustration of text blacklisted when the electronic device screen is displayed on a monitor.

FIG. 3 is an illustration of text blacklisted when the electronic device screen is displayed on a monitor. The electronic device 300 includes on the screen 302 text "89461207" 304 that is listed in the blacklist database 124. Therefore, when the screen 302 of the electronic device 300 is displayed on the monitor 306, the blacklisted text "89461207" 304 is removed 308. In another example, the monitor 306 is a computing device and data on the screen 302 of the electronic device 300 is sent to the monitor 306 in a data transfer, but is not to be displayed. The text "89461207" 304 that is listed in the blacklist database 124 is removed before the information on the screen 302 is transferred to the monitor 306.

Figure 4:
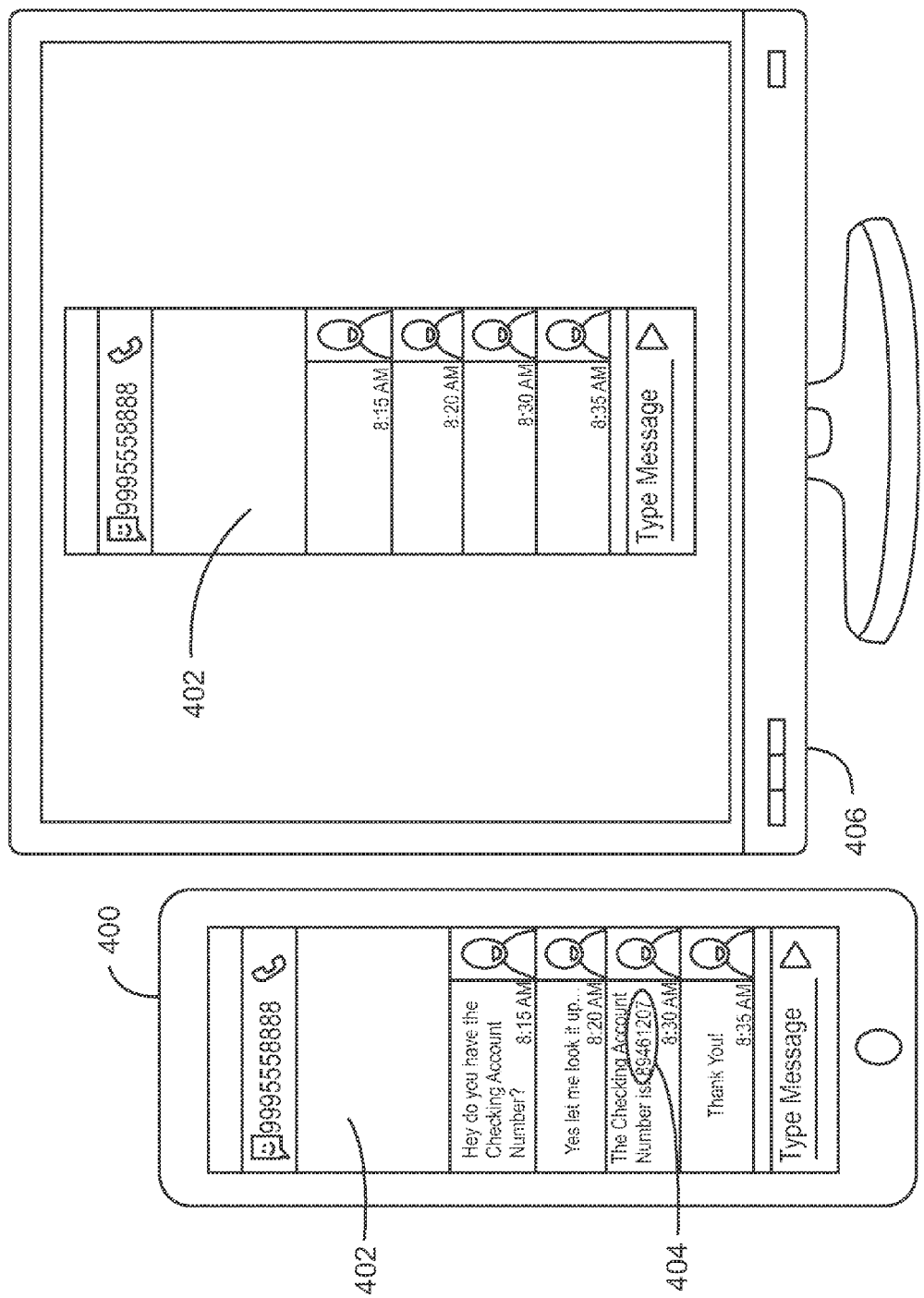
FIG. 4 is an illustration of a color blacklisted when the electronic device screen is displayed on a monitor.

FIG. 4 is an illustration of a color blacklisted when the electronic device screen is displayed on a monitor. The electronic device 400 includes a screen 402. The screen 402 includes text and graphics. A color, for example black, is listed in the blacklist database 124. When the screen 402 of the electronic device 400 is displayed on the monitor 406, all text 404 with the text color listed in the blacklist database 124 (e.g., all text with a text color of black) is removed.

Figure 5:
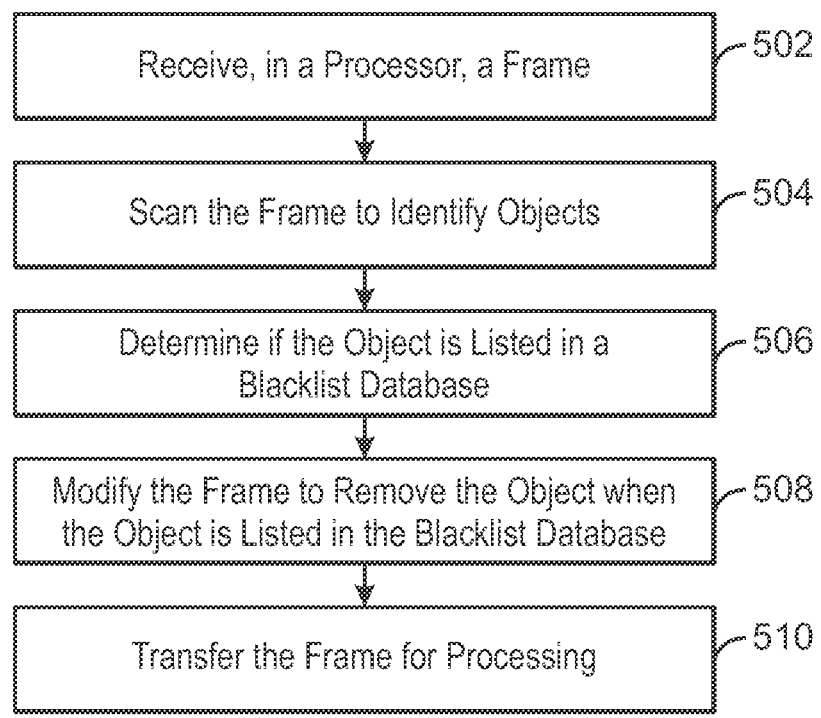
FIG. 5 is a process flow diagram of an example of a method of privacy protection.

FIG. 5 is a process flow diagram of an example of a method of privacy protection. The method can be implemented in an electronic device, such as electronic device 100. At block 502, a frame to be sent to or received from a device is received in a processor 130. The frame can be an image document, such as a photograph, a text document, audio, video, or a combination thereof, among others. In an example, the frame can be a frame that is to be displayed on a display screen, such as a display screen of the device or a display device coupled to the electronic device. In another example, the electronic device can be an image capture device, such as a camera. The frame can be an image or a video to be captured by the camera. In a further example, the electronic device can be an audio capture device, such as a recorder and the frame can be an audio stream. In an additional example, the frame can include data to be sent over a network or to an I/O device.

At block 504, the processor can scan the frame to identify objects. An object can include a word, a phrase, an image, a color, a voice, a sound frequency, or a combination thereof, among others. At block 506, the processor can determine if the object(s) is listed in a blacklist database, such as blacklist database 124. The blacklist database is a list of objects that are not to be sent to or received from a device. The processor can access the blacklist database to determine if the object(s) is listed in the blacklist database.

At block 508, the processor can modify the frame to remove the object when the object is listed in the blacklist database. In an example, when the electronic device is an image capture device, an object listed in the blacklist database can be removed before the image is saved to memory. In another example, the presence of the blacklisted object can be determined during image capture and the image can be captured without the blacklisted object. Similarly, when the electronic device is an audio capture device, the presence of a blacklisted object can be removed from the captured audio stream before saving the audio stream to memory or the blacklisted audio can be excluded during audio capture. In a further example, when the frame is a text document, the object can be a word, a phrase, or a text color and the object can be removed from the text document before displaying the document when the object is included in the blacklist database. In an additional example, a blacklisted object can be removed from data before the data is sent over a network. At block 510, the frame can be transferred for processing.

Figure 6:
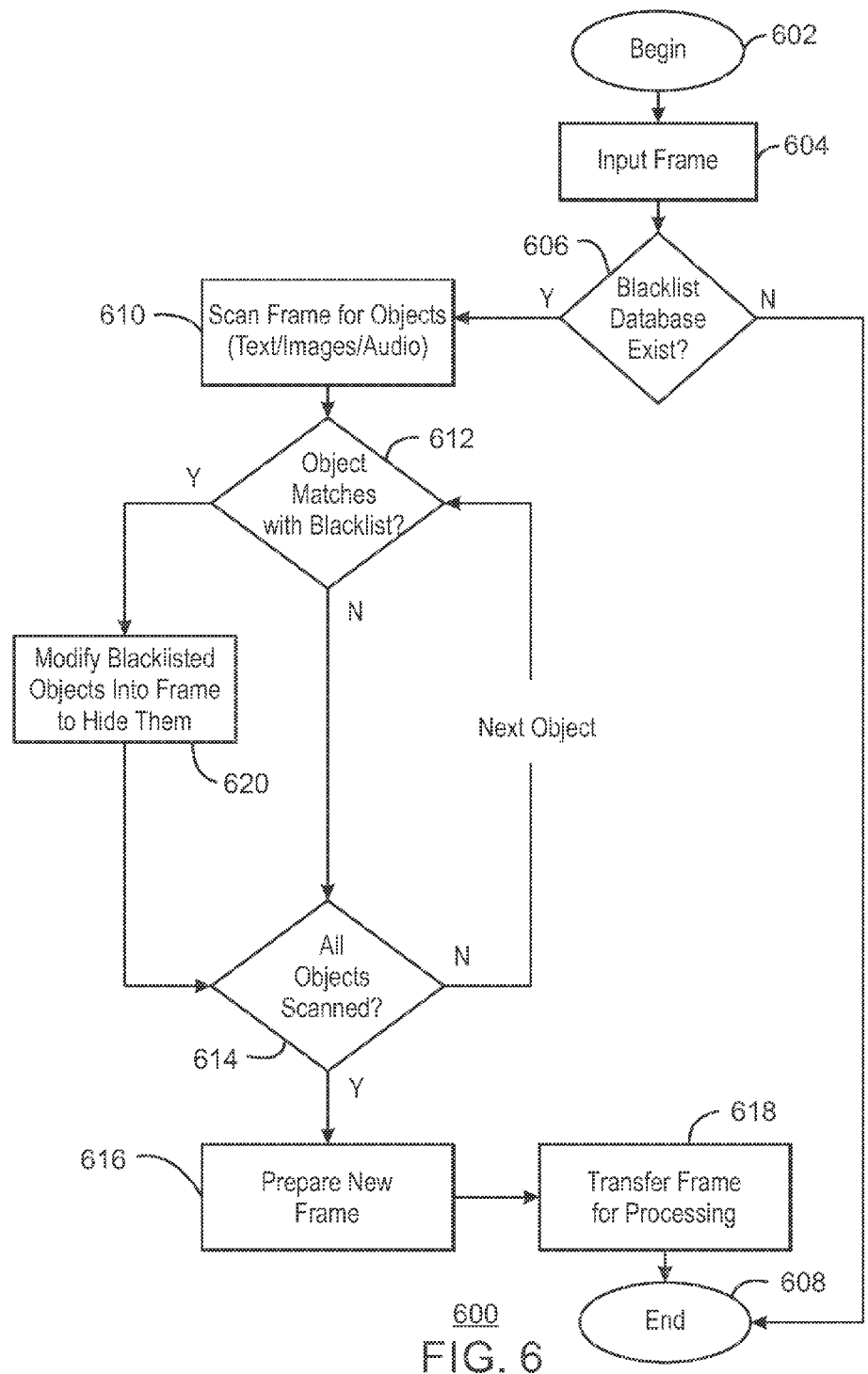
FIG. 6 is a process flow diagram of another example of a method of privacy protection.

FIG. 6 is a process flow diagram of another example of a method of privacy protection. The method can begin at block 602. At block 604, a frame can be input. At block 606, the processor can determine if a blacklist database exists. If the blacklist database does not exist, the method ends at block 608. If the blacklist database does exist, the frame can be scanned for objects at block 610.

At block 612, the processor can determine if the object matches with the blacklist database. If the object does not match with the blacklist database, at block 614, the processor can determine if all objects have been scanned. If all of the objects have not been scanned, the method can return to block 612. If all of the objects have been scanned, at block 616 a new frame can be prepared. At block 618, the new frame can be transferred for processing, and the method can end at block 608.

If the object does match with the blacklist database, the blacklisted object in the frame can be modified to hide the object at block 620. At block 614, the processor can determine if all objects in the frame have been scanned. If all of the objects have not been scanned, the method can return to block 612. If all of the objects have been scanned, at block 616 a new frame can be prepared. The new frame can exclude the object(s) that match with the blacklist database. At block 618, the new frame can be transferred for processing before sending the frame to or receiving the frame from an I/O device, and the method can end at block 608.

EXAMPLE 1

An electronic device is described herein. The electronic device can include a processor and a blacklist database listing objects not to be sent to or received from an electronic device. The processor is to remove an object from a frame before the frame is sent to or received from the electronic device when the object is listed in the blacklist database.

The frame can include an image document, a text document, audio, video, or a combination thereof. The object can include a word, a phrase, an image, a color, a voice, or a combination thereof. The frame can be displayed and displaying the frame can include displaying the frame on a display of the electronic device, displaying the frame on a display device coupled to the electronic device, playing the frame on an audio device, or a combination thereof. The frame can include data to be transferred over a network and the object can be removed from the data before the data is transferred over the network when the object is listed in the blacklist database. The blacklist database can include security protection to restrict access to the blacklist database to the user. A user can modify the blacklist database to add and remove objects to control display of objects.

EXAMPLE 2

An electronic device with privacy protection is described herein. The electronic device can include logic to receive, in a processor, a frame to be transferred to or received from an I/O device and logic to scan the frame to identify objects. The electronic device can also include logic to determine if the object is listed in a blacklist database and logic to modify the frame to remove the object when the object is listed in the blacklist database. The electronic device can additionally include logic to transfer the frame for processing.

The electronic device can further include logic to determine if all objects in the frame listed in the blacklist database have been identified and removed before sending the frame to or receiving the frame from an electronic device. The object can include a word, a phrase, an image, a color, a voice, or a combination thereof. The frame can be displayed and displaying the frame can include displaying the frame on a display of the electronic device, displaying the frame on a display device coupled to the electronic device, playing audio on a speaker, or a combination thereof. The user can update the blacklist database. The blacklist database can include security protection to limit access to the database to the user. The frame can be an image to be captured and the object can be removed from the image when the object is listed in the blacklist database before the image is stored in memory. The frame can be audio and the object can be removed from the audio when the object is listed in the blacklist database during recording of the audio. The frame can include data to be transferred over a network and the object can be removed from the frame before transferring the data over the network.

EXAMPLE 3

At least one non-transitory machine readable medium having instructions stored therein is described herein. The instructions, in response to being executed on an electronic device, cause the electronic device to scan a frame to be sent to or received from an electronic device to identify objects and determine if the object is listed in a blacklist database. The instructions also cause the electronic device to modify the frame to remove the object when the object is listed in the blacklist database and transfer the frame for processing.

The electronic device can determine if all objects in the frame listed in the blacklist database have been identified and removed before sending the frame to or receiving the frame from the electronic device. The object can include a word, a phrase, an image, a color, a voice, or a combination thereof. The frame can be displayed and displaying the frame can include displaying the frame on a display of the electronic device, displaying the frame on a display device coupled to the electronic device, playing audio on a speaker, or a combination thereof. The frame can be an image to be captured and the object can be removed from the image when the object is listed in the blacklist database before the image is stored in memory. The frame can be audio and the object can be removed from the audio when the object is listed in the blacklist database during recording or playing of the audio. The frame can include data to be transferred over a network and the object can be removed from the frame before transferring data over the network.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. An electronic device, comprising:
a processor;
a graphics processor to generate video data to be sent to a remote device in a screen sharing session; and
a blacklist database listing objects not to be sent from the electronic device during the screen sharing session, the objects comprising private information of the user of the electronic device;
wherein the processor is to scan a video frame of the video data to identify an object listed in the blacklist database and remove the object from the video frame before the video frame is sent from the electronic device to the remote device in the screen sharing session.

2. The electronic device of claim 1, wherein the object comprises a word, a phrase, an image, a color, a voice, or a combination thereof.

3. The electronic device of claim 1, wherein the video frame comprises video data to be transferred over a network and wherein the object is removed from the video data before the video data is transferred over the network.

4. The electronic device of claim 1, wherein the blacklist database comprises security protection to restrict access to the blacklist database to the user.

5. The electronic device of claim 1, wherein a user modifies the blacklist database to add and remove objects to control display of objects.

6. An electronic device with privacy protection, comprising:
a graphics processor to generate video data to be sent to a remote device in a screen sharing session;
a blacklist processor coupled to the graphics processor, the blacklist processor to:
receive, from the graphics processor, a video frame of the video data to be transferred to a remote device for display as a part of the screen sharing session;
scan the video frame to identify an object;
determine if the object is listed in a blacklist database comprising a list of blacklisted objects, each blacklisted object comprising private information of the user of the electronic device;
modify the video frame to remove the object if the object is listed in the blacklist database; and
transfer the modified video frame to the remote device in the screen sharing session.

7. The electronic device of claim 6, the blacklist processor to determine if all objects in the video frame listed in the blacklist database have been identified and removed before sending the video frame to the remote device.

8. The electronic device of claim 6, wherein the object comprises a word, a phrase, an image, a color, a voice, or a combination thereof.

9. The electronic device of claim 6, wherein the user updates the blacklist database.

10. The electronic device claim 6, wherein the blacklist database comprises security protection to limit access to the database to the user.

11. The electronic device of claim 6, wherein the video frame comprises graphics data to be transferred over a network and wherein the object is removed from the video frame before transferring the graphics data over the network.

12. At least one non-transitory machine readable medium having instructions stored therein that, in response to being executed on an electronic device, cause the electronic device to:
generate video data to be sent to a remote device in a screen sharing session;
scan a video frame of the video data to be sent from the electronic device to identify an object;
determine if the object is listed in a blacklist database comprising a list of blacklisted objects, each blacklisted object comprising private information of the user of the electronic device;
modify the video frame to remove the object if the object is listed in the blacklist database; and
transfer the frame for processing.

13. The machine readable medium of claim 12, wherein the electronic device determines if all objects in the video frame listed in the blacklist database have been identified and removed before sending the video frame to a remote device.

14. The machine readable medium of claim 12, wherein the object comprises a word, a phrase, an image, a color, a voice, or a combination thereof.

15. The machine readable medium of claim 12, wherein the video frame is to be captured and wherein the object is removed from the video frame before the video frame is stored in memory.

16. The machine readable medium of claim 12, wherein the video frame comprises graphics data to be transferred over a network and wherein the object is removed from the video frame before transferring the graphics data over the network.

* * * * *